(12) United States Patent
Bowling et al.

(10) Patent No.: US 8,375,777 B2
(45) Date of Patent: Feb. 19, 2013

(54) MANIFOLD PRESSURE DETERMINATION DEVICE

(75) Inventors: Bruce Bowling, Havre De Grace, MD (US); Albert Grippo, Virginia Beach, VA (US)

(73) Assignee: BG Soflex LLC, Virginia Beach, VA (US)

(*) Notice: Subject to any disclaimer, the term of this patent is extended or adjusted under 35 U.S.C. 154(b) by 621 days.

(21) Appl. No.: 12/623,178

(22) Filed: Nov. 20, 2009

(65) Prior Publication Data

US 2010/0126260 A1 May 27, 2010

Related U.S. Application Data

(60) Provisional application No. 61/116,845, filed on Nov. 21, 2008.

(51) Int. Cl.
*G01M 15/04* (2006.01)
(52) U.S. Cl. .................................................. 73/114.37
(58) Field of Classification Search ............... 73/114.16, 73/114.37
See application file for complete search history.

(56) References Cited

U.S. PATENT DOCUMENTS

| | | | | |
|---|---|---|---|---|
| 4,475,381 | A * | 10/1984 | Nakatomi et al. | 73/114.37 |
| 4,892,074 | A * | 1/1990 | Iriyama | 123/406.22 |
| 7,062,955 | B2 * | 6/2006 | Kashiwase et al. | 73/114.16 |
| 7,079,936 | B2 * | 7/2006 | Honda | 701/102 |
| 7,082,830 | B2 * | 8/2006 | Kunda et al. | 73/514.35 |
| 7,201,063 | B2 * | 4/2007 | Taylor | 73/841 |
| 7,606,651 | B2 * | 10/2009 | Kojima et al. | 701/102 |
| 8,146,409 | B2 * | 4/2012 | Catanese et al. | 73/114.16 |
| 2005/0241409 | A1 * | 11/2005 | Taylor | 73/841 |
| 2009/0038385 | A1 * | 2/2009 | Catanese et al. | 73/114.16 |

* cited by examiner

*Primary Examiner* — Freddie Kirkland, III
(74) *Attorney, Agent, or Firm* — Procopio, Cory, Hargreaves & Savitch, LLP (57) ABSTRACT

A pressure measurement system includes a multiplexer unit which inputs a plurality of electrical signals representative of pressures, and a comparison unit which compares the electrical signals among each other to determine a specified signal characteristic, wherein the multiplexer unit selects one of the electrical signals as an output signal based on the determination of the specified signal characteristic, and outputs the selected signal.

19 Claims, 10 Drawing Sheets

*Prior Art*

FIG. 1

*Prior Art*

*Prior Art*

MANIFOLD PRESSURE DETERMINATION DEVICE

CROSS REFERENCE TO RELATED APPLICATIONS

This application claims the benefit of U.S. Provisional Application No. 61/116,845 filed Nov. 21, 2008. The entire disclosure of the provisional application No. 61/116,845 is incorporated herein by reference.

BACKGROUND OF THE INVENTION

1. Field of the Invention

Systems and methods consistent with the present invention determine mass air charge for internal combustion engines, and more particularly to determine mass air charge for internal combustion engines which have separate intake runners and throttle valves operating with each engine cylinder or group of engine cylinders.

2. Description of the Related Art

The need for increased control of internal combustion (IC) Engines has been an ever-present requirement. Over the years, control systems targeted to IC engines have become more sophisticated and complex in order to meet the needs of stricter environmental and operational constraints. One focus of IC engine control system development relates to maintaining an accurate air-fuel ratio (AFR) over all engine conditions. Determination of AFR requires accurate determination of the amount of air mass entering the engine during intake stroke. The amount of air mass is then matched with an appropriate fuel mass to achieve proper engine operation. Methods of controlling the metered fuel accurately with the use of fuel injectors having predetermined flow rates are known. However, determining air mass is more difficult.

One method of determining the mass of air is by using of a mass air flow sensor (MAF) in order to directly measure the mass of air during the intake air cycle. Mass air sensors are accurate during steady-state operation. However, during transient events, for example engine acceleration, throttle position change, etc, errors due to manifold volume effects (also known as manifold filling/emptying) result from the use of mass air sensors.

To determine the mass of air actually entering an engine intake port, a known speed density (SD) method is used. The SD method uses the ideal gas law to calculate the density of the air in a cylinder in an indirect manner from measured pressure in the intake manifold. From this measured intake manifold pressure, the cylinder volume and volumetric efficiency (VE), a determination of actual mass air charge in the cylinder can be obtained. The SD method can be used by itself or combined with a MAF sensor for increased accuracy over all engine operating conditions.

Cylinder pressure is determined using a manifold absolute pressure (MAP) sensor to sample the pressure of the intake manifold. At the bottom dead center (BDC) position of a piston in a cylinder bore, and the output signal of the MAP sensor is sampled, and this sampled value is used to determine air pressure in the cylinder, and hence, cylinder air density. For engine configurations having a common intake manifold plenum, i.e., all of the cylinders open to a common intake manifold, pressure may be determined for each cylinder using a single MAP sensor by sampling the MAP sensor output at the BDC position of each cylinder.

However, there exists a class of IC engines which uses individual throttles and individual intake runners for each cylinder. This arrangement is known as an individual throttle body (ITB) arrangement. This arrangement does not have a common intake plenum area. Instead, each intake throttle and runner is isolated from the others. Since there is no common intake plenum on ITB arrangements, sampling manifold absolute pressure is more difficult.

In one prior art method of sampling manifold absolute pressure, small diameter flexible tubing is used to connect each runner into a single point (using multiple "T" couplings) where the MAP reading is sampled. However, the small diameter of tubing can degrade the absolute pressure reading. In addition, while one cylinder is undergoing an intake stroke the pressure reading on the common-tubing is being altered by the other intake throttle plates. Thus, the overall pressure is not an accurate representation of the cylinder under intake stroke, and is instead closer to an average of each intake runner with delay components introduced due to flow delays in the sensor tubing.

Existing aftermarket ITB engine control units (ECUs) utilize a single MAP sensor and, correspondingly, a single MAP signal detection input. Generally, the signal generated by a MAP sensor is an analog voltage which is proportional to absolute pressure. On the ECU, a single channel Analog-to-Digital Converter (ADC) is used to sample the analog voltage signal generated by the MAP sensor. ADC channels are precious resources on microprocessor-based ECUs, and there are many analog voltage signals from various sensors that require input channels to the ECU. Using separate MAP sensors on engines having a high number of cylinders is not practical with the limited number of on-board ADC channels.

Figure 1:
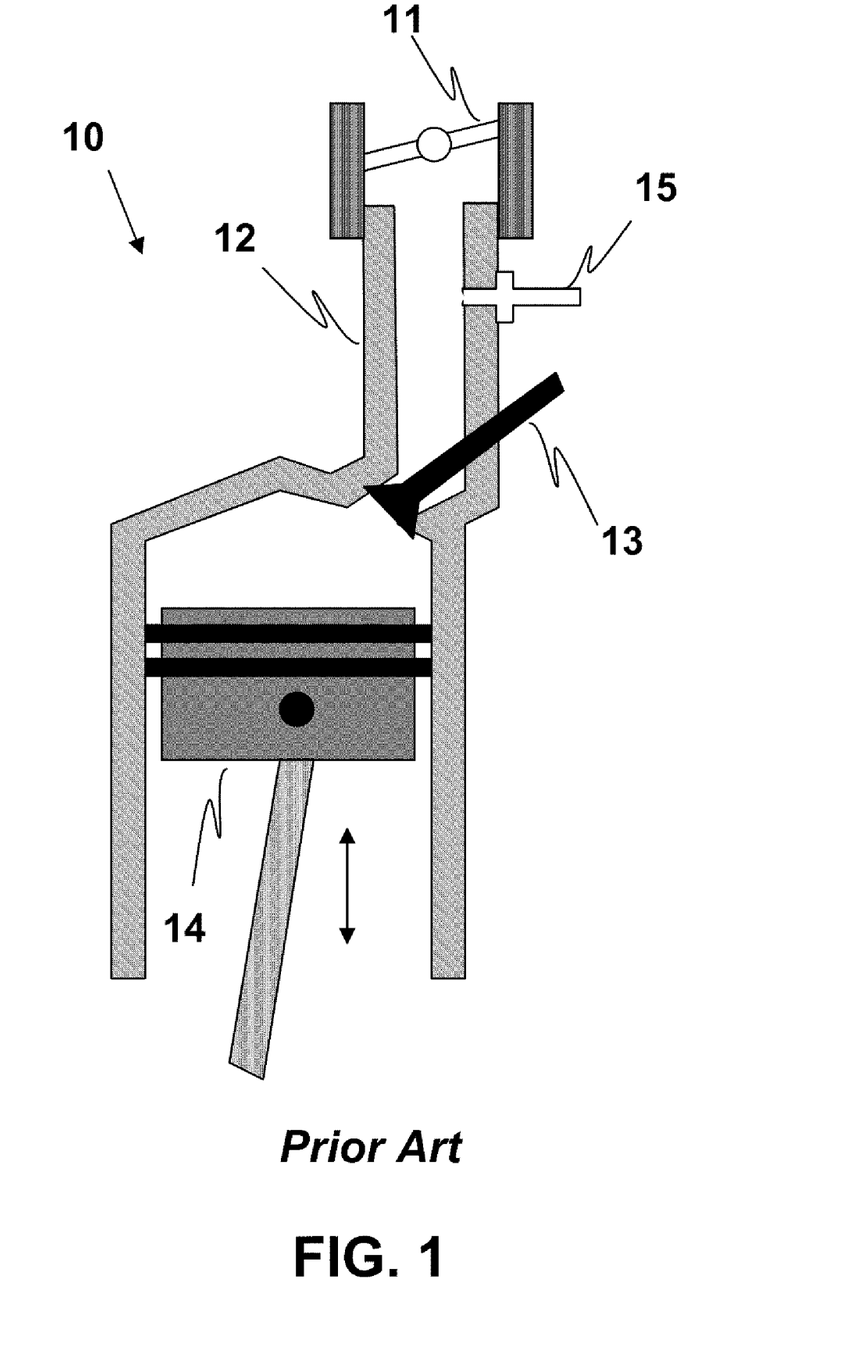
FIG. 1 is an illustration of an IC engine depicting a conventional intake tract and cylinder for a single ITB.

FIG. 1 is an illustration of an IC engine depicting a conventional intake tract and cylinder for a single ITB. Referring to FIG. 1, a single engine cylinder arrangement 10 utilizing an ITB throttle body 16 and intake runner 12 is illustrated. Air flow into a cylinder 17 is controlled by ITB throttle plates 11 and is admitted into the intake runner 12. Engine air intake is controlled by intake valve 13. Piston 14 moves within the single engine cylinder arrangement 10.

It should be noted that a multi-cylinder ITB arrangement has multiple cylinders of the arrangement illustrated in FIG. 1, each operating independently from one another. Pressure in each intake runner is independent as well. The pistons are arranged at different positions within each cylinder, phased with respect to crankshaft rotation according to the number of cylinders. For example, in a 4-stroke cycle engine, the phasing between cylinders is about 720 degrees of crankshaft rotation divided by the number of cylinders. For a 2-stroke cycle arrangement phasing is generally about 360 degrees of crankshaft rotation divided by the number of cylinders. Odd fire engine geometries will slightly alter the relative phase between cylinders. However, the concept is still the same. It should be noted that only one cylinder is undergoing an intake event at any given time. It is the cylinder undergoing an intake event for which the intake mass air calculation is desired, so that an appropriate fuel/air mixture can be determined by the time the compression stroke is started and fuel needs to be injected.

In order to determine the cylinder pressure for the speed-density control calculation, an intake runner pressure port 15 is utilized. In an exemplary embodiment of the present invention, a sampling event is correlated with piston position at BDC of an intake stroke. This is the point where the cylinder volume is at maximum, and correlates approximately to minimum cylinder pressure.

Figure 2:
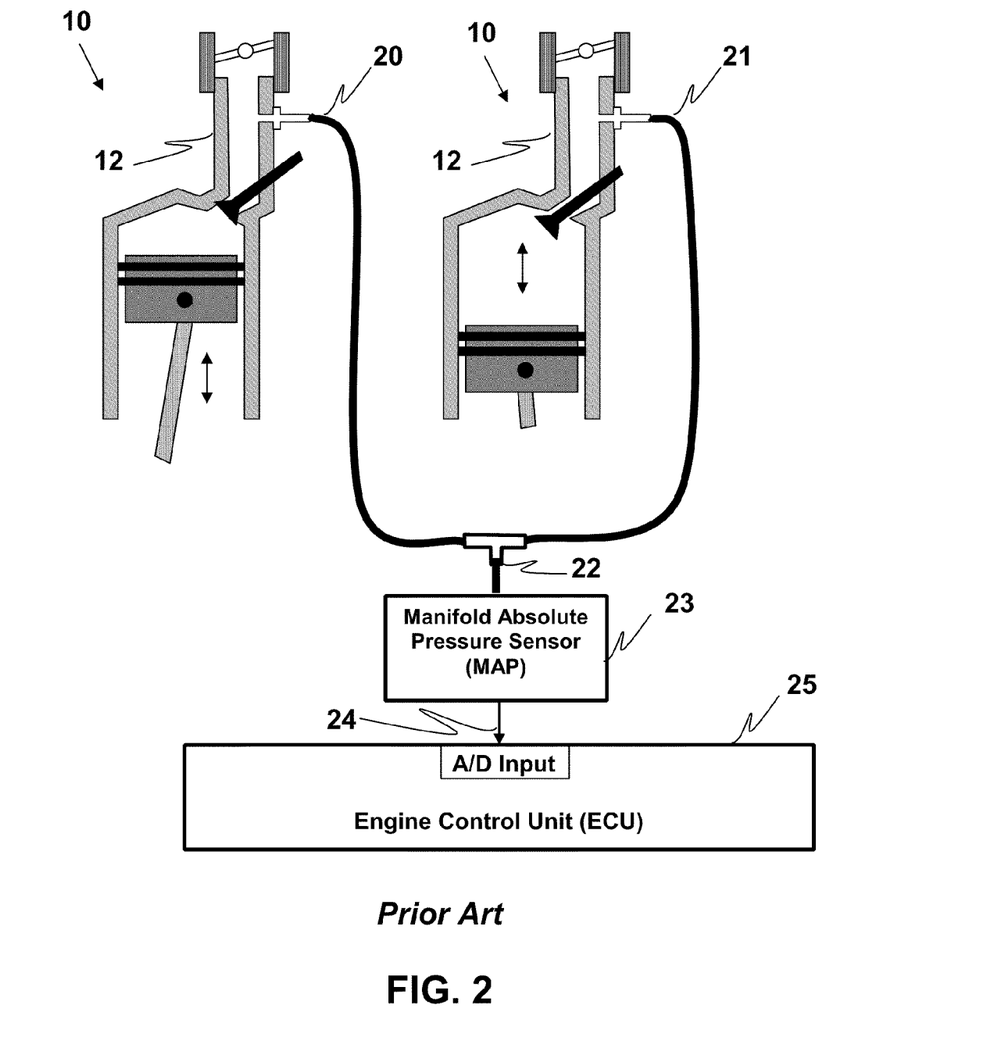
FIG. 2 is an illustration of a prior art cylinder pressure sampling arrangement utilizing a single MAP sensor interfaced with multiple cylinders using a Tee arrangement.

FIG. 2 is an illustration of a prior art cylinder pressure sampling arrangement utilizing a single MAP sensor interfaced with multiple cylinders utilizing ITB manifolds. In FIG. 2, only two cylinders 10 are shown, however the illustration may be extended to any number of cylinders. This configuration sums all of the intake runner pressures utilizing a pressure channel interconnect setup.

Referring to FIG. 2, tubes 20 and 21 made of rubber, plastic, or metal, or casting channels, come together at a summing point 22. The pressure at the summing point 22 is measured by a standard MAP sensor arrangement 23. The pressure at the summing point 22 is converted to a voltage signal 24 and input to the ECU 25. At any instant in time the pressure signal at the summing point 22 represents the approximate sum of all of the intake runner pressures. Since each cylinder is at a different operating point of the Otto cycle, the pressure at the summing point 22 is proportional to the sum of the absolute pressures in each intake runner 12.

SUMMARY OF THE INVENTION

Exemplary embodiments of the present invention overcome the disadvantages described above and other disadvantages not described above. Also, the present invention is not required to overcome the disadvantages described above, and an exemplary embodiment of the present invention may not overcome any of the problems described above.

The present invention provides systems and methods for determining mass air charge for internal combustion engines which have separate intake runners and throttle valves operating with each engine cylinder or group of engine cylinders.

According to an aspect of the present invention there is provided a pressure measurement system having a multiplexer unit which inputs a plurality of electrical signals representative of pressures, and a comparison unit which compares the electrical signals among each other to determine a specified signal characteristic, wherein the multiplexer unit selects one of the electrical signals as an output signal based on the determination of the specified signal characteristic, and outputs the selected signal.

According to another aspect of the present invention there is provided a pressure measurement system having a processor which inputs a plurality of electrical signals representative of pressures and compares the electrical signals among each other to determine a specified signal characteristic, wherein the processor selects one of the electrical signals as an output signal based on the determination of the specified signal characteristic, and an output unit which outputs the selected signal.

According to yet another aspect of the present invention there is provided a method of measuring pressure having receiving a plurality of electrical signals representative of pressures, comparing the plurality of received electrical signals among each other to determine a specified signal characteristic, and selecting one of the electrical signals as an output signal based on the determination of the specified signal characteristic.

Exemplary embodiments of the present invention also provide a computer readable medium having stored therein a program for causing a processor to execute a method of measuring pressure, the program including computer executable instructions for performing steps including receiving a plurality of electrical signals representative of pressures, comparing the plurality of received electrical signals among each other to determine a specified signal characteristic, and selecting one of the electrical signals as an output signal based on the determination of the specified signal characteristic.

BRIEF DESCRIPTION OF THE DRAWINGS

The above and other aspects and features of the present invention will be more apparent by describing exemplary embodiments of the present invention with reference to the accompanying drawings, in which.

DETAILED DESCRIPTION OF EXEMPLARY EMBODIMENTS

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

The invention utilizes separate MAP sensors, one for each intake runner, which will capture each runner's instantaneous pressure, and present a single overall output voltage that represents the absolute pressure in the intake runner under drawdown. The invention effectively multiplexes that particular cylinder's pressure obtained by its corresponding MAP sensor to the single channel presented by the existing aftermarket ECU.

Exemplary embodiments of the present invention manage the signals from the plurality of MAP sensors. Most Engine Control Units (ECU) possess a single MAP signal input, and it is desired to "route" the MAP sensor signal that represents the cylinder that is experiencing the intake stroke. The invention uses the fact that when the cylinder is undergoing the intake stroke its volume is increasing. This expansion results in a decided drop in absolute pressure (Ideal Gas Law, assuming the mixture temperature is constant over the drawdown cycle). By simultaneous monitoring of each MAP sensor, the sensor with the decrease in voltage will indicate the cylinder undergoing the intake cycle. Hence, the lowest voltage MAP sensor represents the cylinder under drawdown and is the one that is desired for ECU sampling. By employing a hardware comparator arrangement and analog switches, the outputs can be compared with each other to determine which MAP signal should be routed to the ECU. Alternatively, a dedicated processor with many ADC channels and a DAC output could determine the cylinder under drawdown and route the signal. Thus, the MAP signal presented to the ECU represents the cylinder experiencing the intake stroke while the other MAP signals are excluded. With this, a numerically-accurate representation of the intake pressure (and hence cylinder pressure) is used in the fuel calculations by the ECU.

An additional benefit exemplary embodiments of the present invention is that, by knowing which cylinder is undergoing an intake cycle, this knowledge can be used to determine the engine cycle at any moment. This knowledge can be directly used to determine injection and ignition sync. For 4-cycle engines fitted with port-injection and/or coil-on-plug arrangements determining synchronization generally required a camshaft-position sensor. This sensor generally provides a pulse(s) which represents the position of the camshaft which is used to determine engine cycle. The exemplary embodiments presented here also provide this information and can be employed, thus eliminating the need of a camshaft sensor. In fact, very rapid engine sync can be achieved since determining the cylinder under intake stroke will be realized whenever one MAP signal is below the other average signals. Use of this knowledge will result in determination of engine cycle within one cylinder drawdown event; this information can be used by the ECU to initiate the correct ignition and injection events with respect to crankshaft location.

Still another benefit relates to throttle plate alignment. ITB arrangements utilize individual throttle plates per cylinder. The open area introduced by the throttle plates dictates the mass air flow, and must be similar for each cylinder. The act of "balancing" the throttle plate openings is performed in order to equalize the mass air flow in each ITB with respect to all others. This is a difficult task to accomplish, especially when a single MAP sensor is shared amongst all intake runners. With individual MAP sensors and the routed MAP signal any imbalance is immediately noticeable by variation in amplitude. By monitoring the routed MAP signal's amplitude variation, adjustments can be made to individual throttle plates in order to achieve equal amplitudes in the routed signal, denoting equal mass air flow in each runner.

Exemplary embodiments of the present invention utilize a plurality of separate MAP sensors, one for each intake runner of an internal combustion engine having individual throttle bodies, which will capture instantaneous pressures of each runner, and output a single overall output voltage signal that represents the absolute pressure in the intake runner during an intake cycle. The exemplary embodiments effectively multiplex that particular cylinder's pressure obtained by its corresponding MAP sensor to one signal output to an ECU. In this manner, exemplary embodiments of the present invention manage signals from the plurality of MAP sensors.

Figure 3:
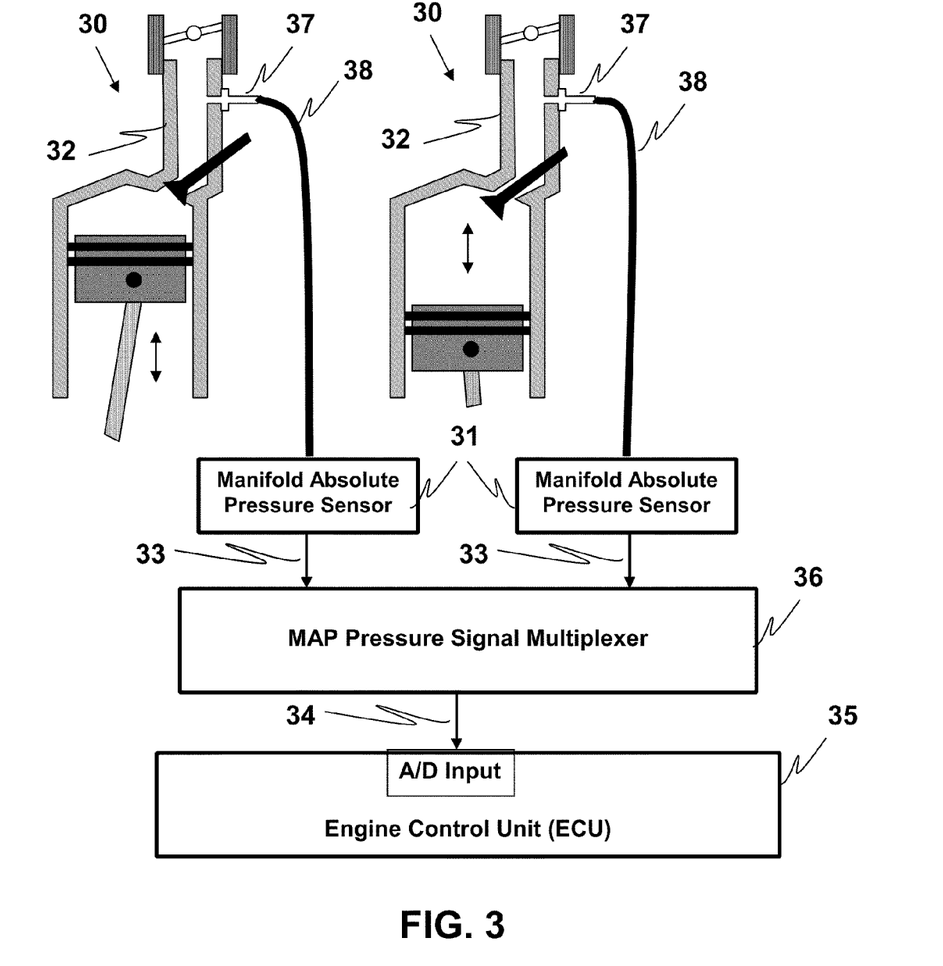
FIG. 3 is an illustration of a multiple MAP sensor arrangement providing a single MAP signal output to an ECU according to an exemplary embodiment of the present invention.

FIG. 3 is an illustration of a multiple MAP sensor arrangement providing a single MAP signal output to an ECU according to an exemplary embodiment of the present invention. In the exemplary embodiment shown in FIG. 3, only two engine cylinders 30 are depicted. However, one of ordinary skill in the art will appreciate that exemplary embodiments of the present invention will also operate with engines having more than two cylinders.

Referring to FIG. 3, the intake runner 32 of each engine cylinder 30 is sampled by its own MAP sensor 31 connected to intake runner pressure port 37 by tube 38. One of ordinary skill in the art will understand that tube 38 may include, for example but not limited to, tubes made from rubber, plastic, or metal, or casting channels. Accordingly, there are the same number of MAP sensors 31 as there are intake runners 32.

Since each intake runner 32 remains isolated from the intake runners of other engine cylinders, each MAP sensor 31 measures only the pressure of its corresponding intake runner 32. A plurality of MAP sensor output voltage signals 33 are presented to the MAP pressure signal multiplexer 36. The MAP pressure signal multiplexer 36 determines which MAP sensor output voltage signal 33 corresponds to an engine cylinder 30 undergoing an intake cycle and to routes this corresponding MAP sensor output voltage signal to the output of the MAP pressure signal multiplexer 38. The MAP pressure signal multiplexer 36 outputs the determined MAP sensor output voltage signal 34 to the ECU 35.

As described above, as a result of the relative phasing of the cylinders during the Otto cycle, only one cylinder will be experiencing an intake event and eventual BDC volume event (required for proper speed-density sampling). Therefore, the above-described multiplexing may be implemented.

Figure 4A:
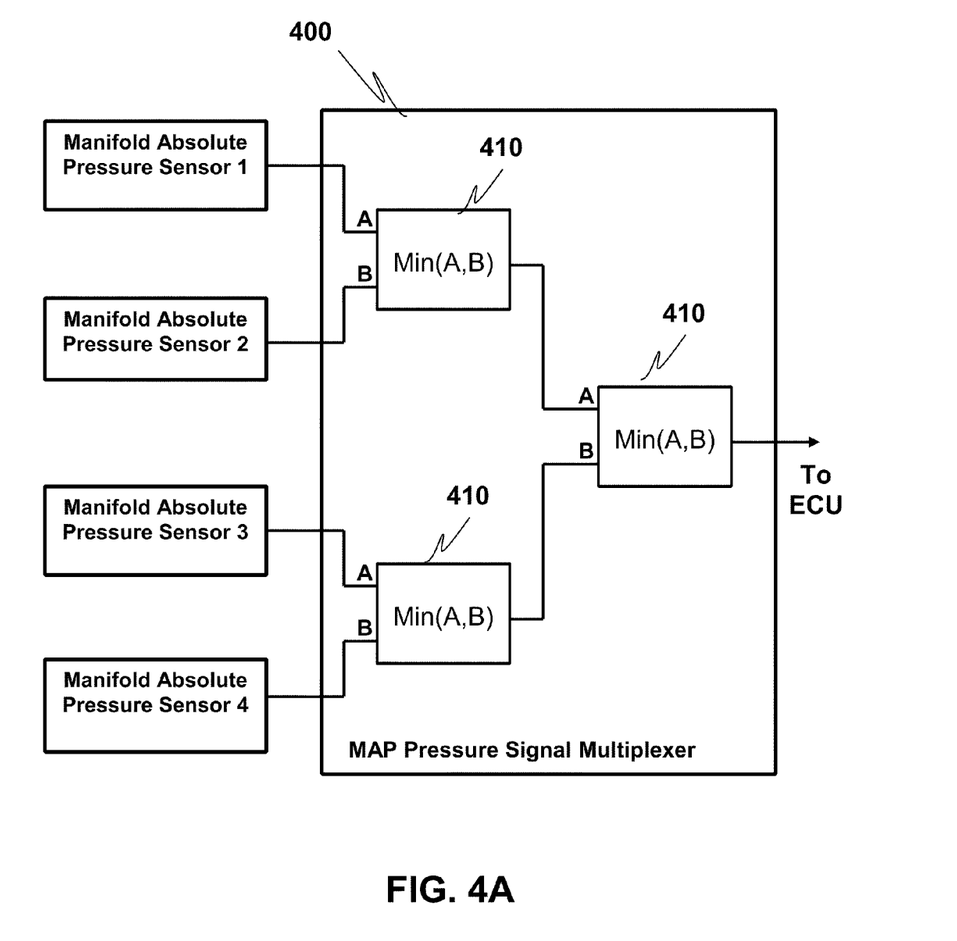
FIG. 4A is signal flow diagram of a multiple MAP sensor multiplexing arrangement according to an exemplary embodiment of the present invention.

FIG. 4A is signal flow diagram of a multiple MAP sensor multiplexing arrangement 400 according to an exemplary embodiment of the present invention. The MAP sensor multiplexing arrangement 400 illustrated in FIG. 4A performs a binary-tree comparison of adjacent MAP sensors. Based on the comparison, the MAP sensor voltage signal that is determined to have the lowest voltage value is passed as the output signal. The comparison may be performed with a comparison unit 410.

Figure 4B:
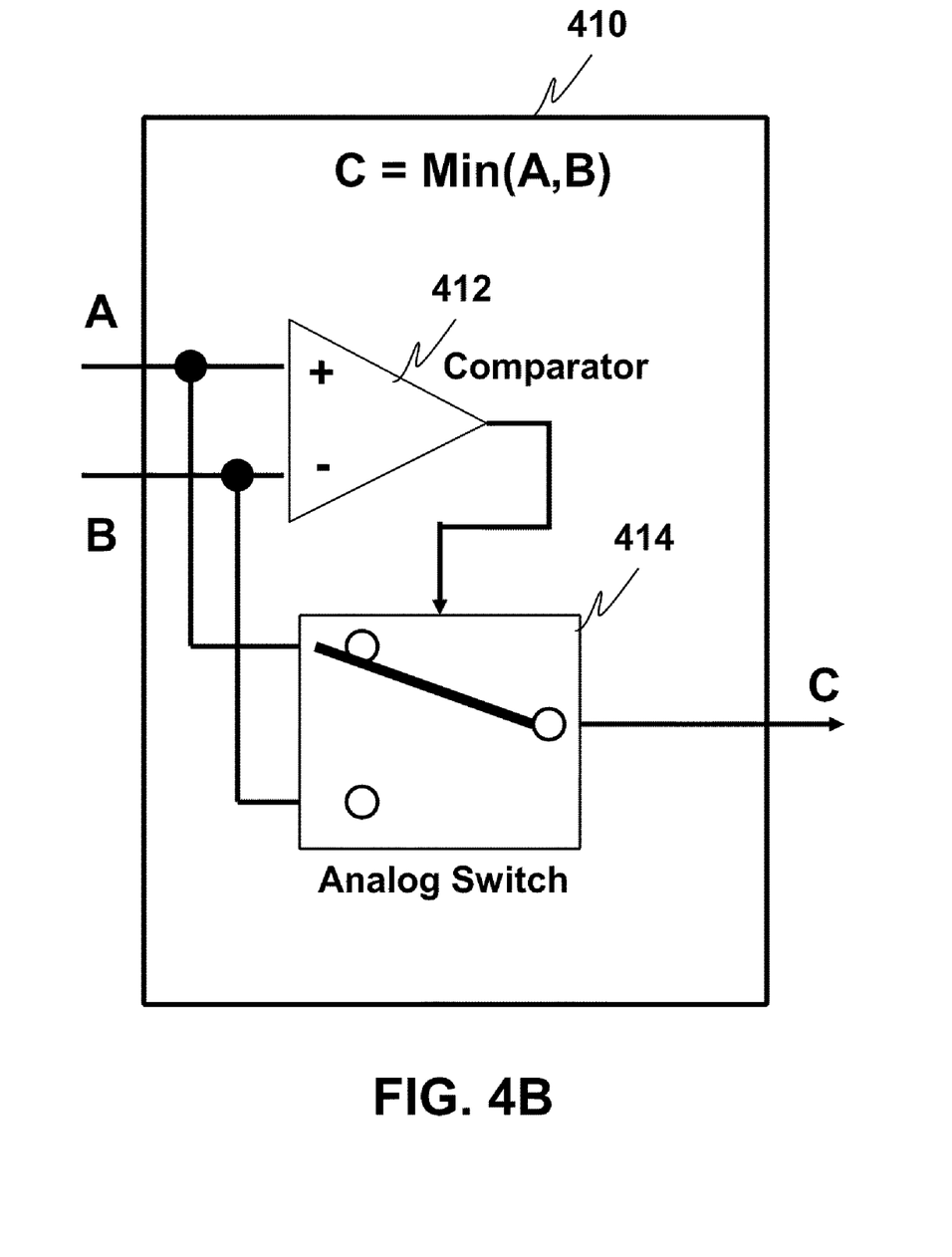
FIG. 4B is an illustration of a comparison unit according to an exemplary embodiment of the present invention.

FIG. 4B is an illustration of a comparison unit according to an exemplary embodiment of the present invention. The comparison unit 410 may include, for example but not limited to, one or more voltage comparators 412, operational amplifiers, or other appropriately configured circuitry for comparing electrical signals as known to those of ordinary skill in the art. The signal determined to have the lowest voltage value may be output with, for example but not limited, to an analog switch 414 or equivalent device. One of ordinary skill in the art will appreciate that while a comparison based on a voltage signal is described above, the comparison is not limited to being performed based on a voltage signal.

One of ordinary skill in the art will appreciate that inter-signal low-pass filtering circuitry (not shown) may be used to reduce unwanted noise on the electrical signals, and an output driver stage (not shown) capable of satisfying the ECU input signal requirements may also be used.

Figure 6:
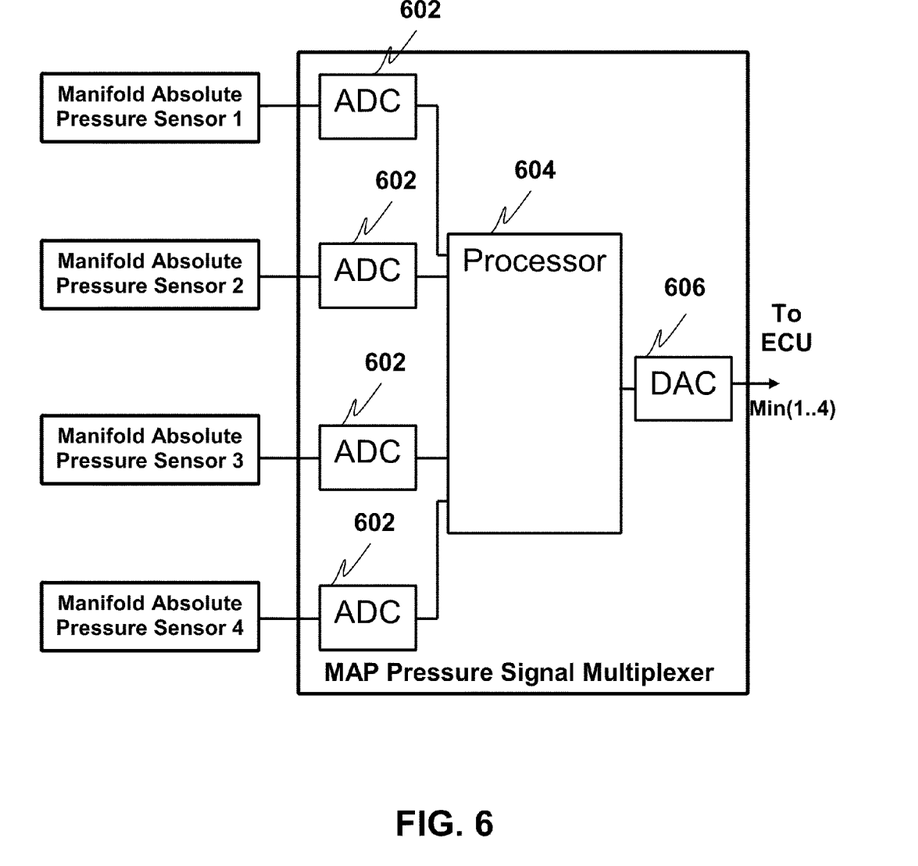
FIG. 6 is a block diagram illustrating a processor for performing comparison of MAP sensor output signals according to an exemplary embodiment of the present invention.

FIG. 6 is a block diagram illustrating a processor for performing comparison of MAP sensor output signals according to an exemplary embodiment of the present invention. Map sensor multiplexing may also be accomplished by the use of a dedicated A/D converter 602 for each MAP sensor. The dedicated A/D converters 602 may be controlled by a processor 604, for example but not limited to, a microprocessor or microcontroller. The processor 604 may be dedicated to controlling the A/D converters 602 for the MAP sensors.

Simultaneous sampling of the A/D channels produces a digital signal representing the output voltage signal state of each of the MAP sensors The processor 604 may perform a comparison to determine which of the A/D channels has the minimum MAP sensor output signal. The comparison result may be presented to the ECU by means of a digital-to-analog (D/A) converter 606 or digital signaling means. The A/D and D/A converters may be separate from the processor or one or both may be incorporated in the processor. By taking multiple samples of the low-pass filtered MAP sensor output signals in the region just before and just after the piston positions at cylinder BDC, additional benefits of increased signal-to-noise ration may be achieved.

The processor 604 may comprise memory which stores program instructions for causing the processor to perform required operations consistent with exemplary embodiments of the present invention. Alternatively or additionally, program instructions may be embodied on various types of computer readable media known to those skilled in the art which may be used to provide program instructions consistent with exemplary embodiments of the present invention to the processor. Further, one of ordinary skill in the art will appreciate that the above-mentioned inter-signal low-pass filtering may alternatively or additionally be performed using digital filters implemented in software or firmware.

Figure 5:
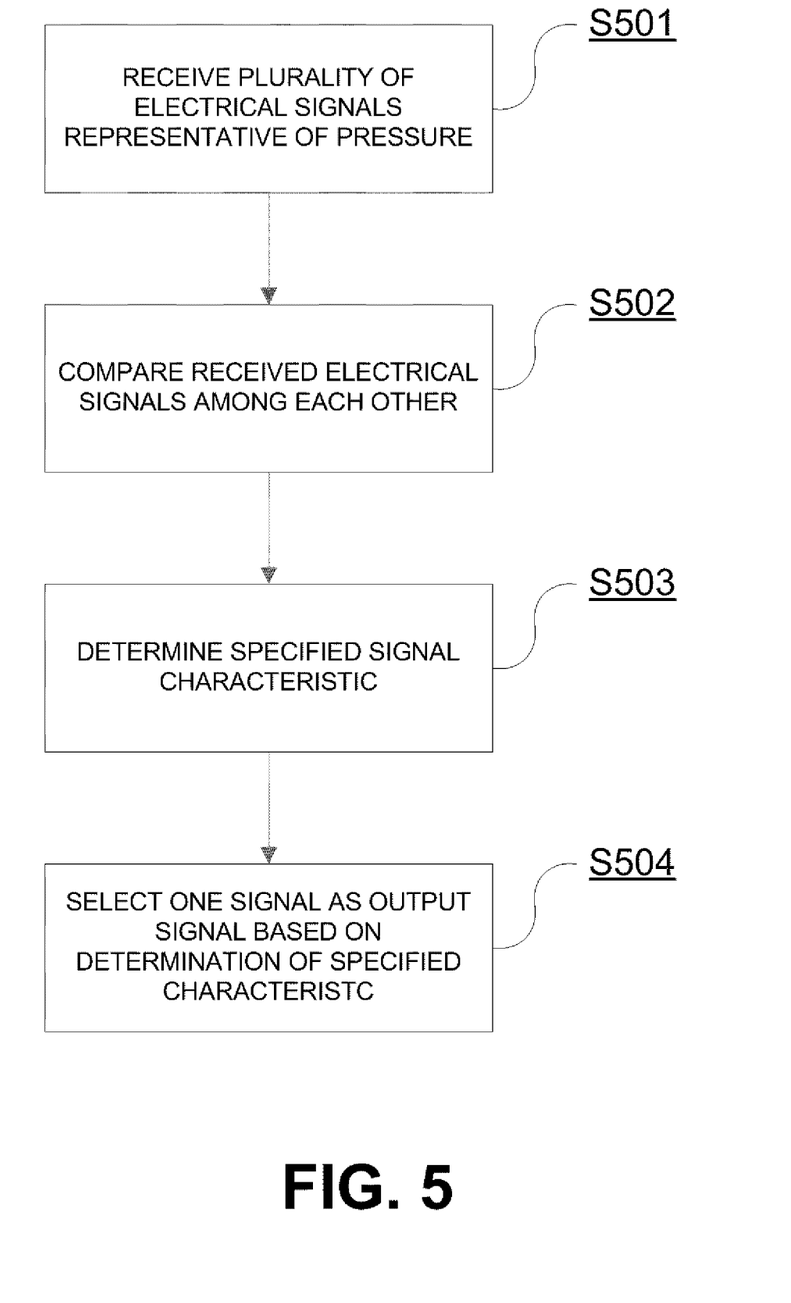
FIG. 5 is a flowchart illustrating a pressure measurement method according to an exemplary embodiment of the present invention.

FIG. 5 is a flowchart illustrating a pressure measurement method according to an exemplary embodiment of the present invention. Referring to FIG. 5, a plurality of electrical signals representative of pressures is received S501. The received electrical signals are compared among each other S502, and a specified signal characteristic is determined S503. Based on the determination of the specified signal characteristic, one of the electrical signals is selected as an output signal S504.

Comparison measurements of a prior art system for sampling manifold absolute pressure and an implementation of the exemplary embodiment performed on a Honda F4I four cylinder engine are outlined herein.

Figure 7:
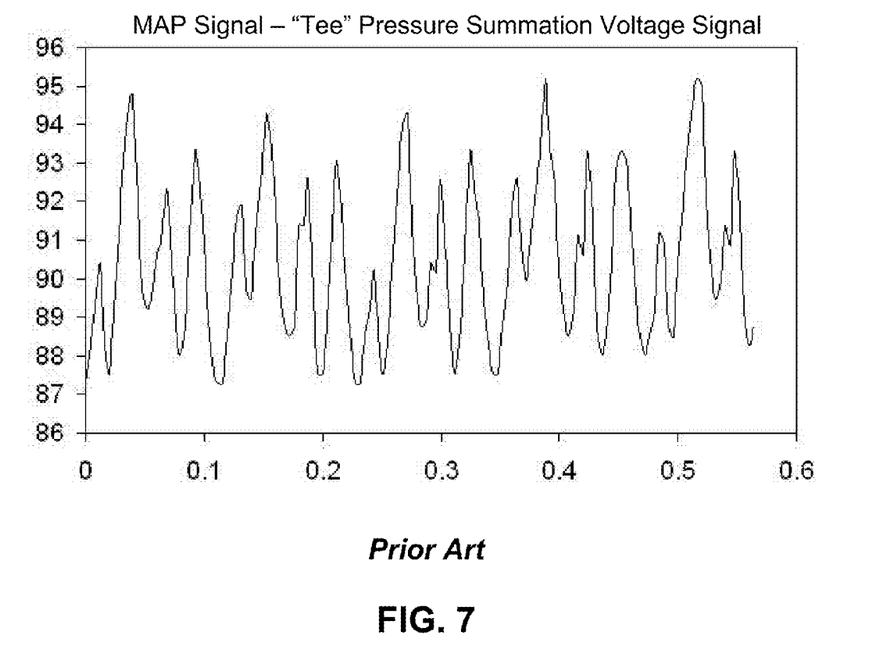
FIG. 7 is a graph illustrating a direct measurement of a prior art MAP sensor signal output to the ECU over a plurality of engine cycles for a system utilizing a prior art pressure sampling arrangement.

FIG. 7 is a graph illustrating a direct measurement of a prior art MAP sensor signal output to the ECU over a plurality of engine cycles for a system utilizing a prior art pressure sampling arrangement. Referring to FIG. 7, a running plot of MAP sensor output signal voltage readings for the prior art "tee" method is shown. The plot represents the output signal from a single MAP sensor which is reading instantaneous pressures of all the cylinder utilizing the pressure ports and a summation connection. See for example FIG. 2. The naturally-aspirated engine was operating at idle under a fully-warmed operation. In FIG. 7, the absolute pressure values at minimum waveform nodes are in the 87 KPa range while the maximum absolute pressure values are in the 95 KPa range. This yields a pressure range of 12 KPa, which is not a very significant range deviation compared to sensor and ambient pressure range.

Figure 8:
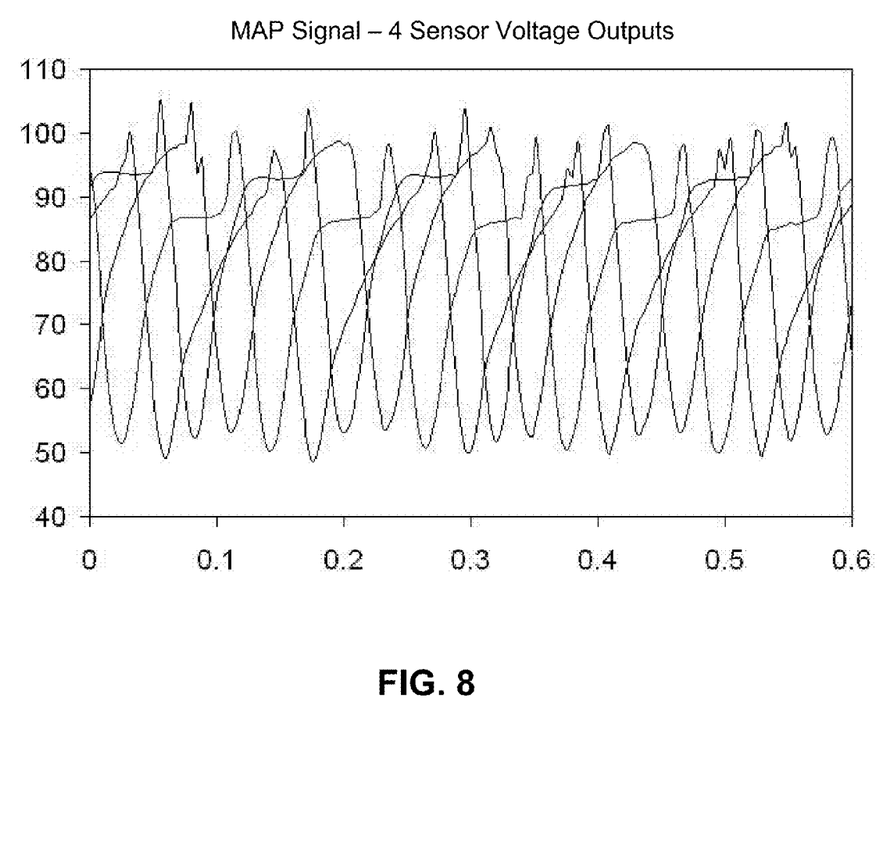
FIG. 8 is a graph illustrating a direct measurement of individual MAP sensor outputs on a 4-cylinder ITB engine showing the relative pressure structure of each signal according to an exemplary embodiment of the present invention.

FIG. 8 is a graph illustrating a direct measurement of individual MAP sensor outputs on a 4-cylinder ITB engine showing the relative pressure structure of each signal according to an exemplary embodiment of the present invention. In comparison to the summation effect illustrated in FIG. 7 that the "tee" connection yields on the overall MAP signal, FIG. 8 is a graph of the pressure of individual intake runner ports measured by separate MAP sensors. A comparison of the plot of FIG. 8 with that of FIG. 7 shows a dramatic increase in dynamic range of each cylinder's pressure—minimum absolute pressure is in the 50 KPa range while maximum absolute pressure is above 100 KPa. This represents a five-fold increase in MAP sensor output voltage signals. Additionally, clearly visible on the graph are the pressure cycles of each intake runner compared to the pressure cycles of the intake runners of the other cylinders. Again, this is due to the phase shift in the Otto cycle of each cylinder relative to the other cylinders. This instantaneous pressure information can be utilized to indicate cylinder phasing. More importantly, the cycle of cylinder #1 can be identified by the multiplexer arrangement of the exemplary embodiment and used for engine camshaft positional timing. This eliminates the need for an external camshaft position sensor, which is typically required for sequential fuel injection and coil-on-plug ignition applications.

An additional aspect of maintaining separate intake runner multiple MAP sensor sampling relates to balancing of the mass air flow across the throttle plate on each intake runner. Again referring to FIG. 8 and noting the minimum absolute pressure values of each cylinder, the MAP sensor data may be used to equalize the pressure variations among the cylinders. In contrast, as can be seen in the prior art system output signals of FIG. 7, a pattern of pressure minimums, as well as which runner shows a pressure deviation compared to the others, is difficult to determine due to the summation of pressures of the intake runners. Equalizing mass flow across the throttle plates for each runner is also important for obtaining optimum economy, performance, and engine operation.

Figure 9:
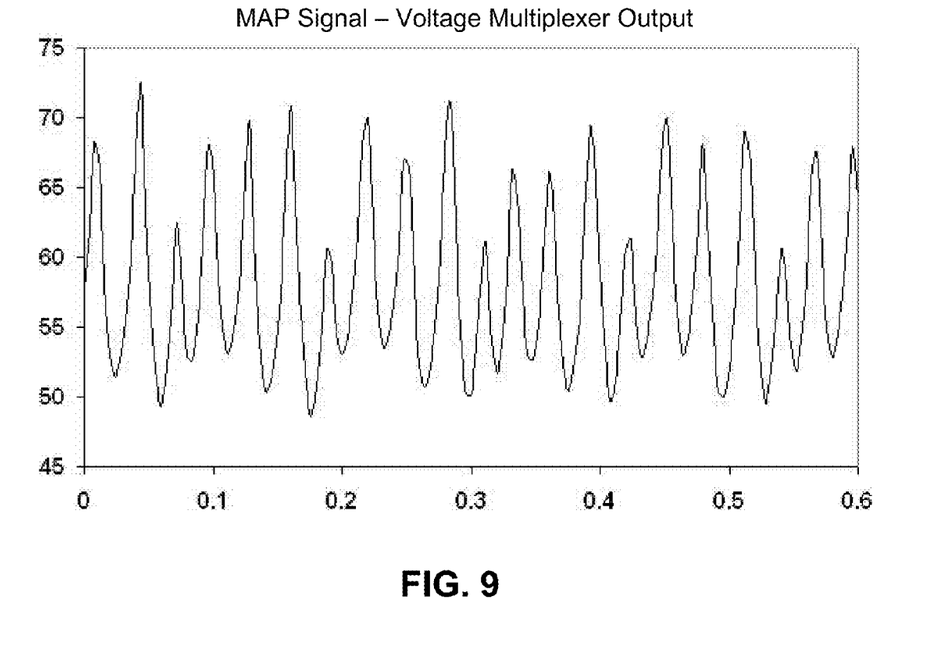
FIG. 9 is a graph illustrating a direct measurement of a MAP multiplexed signal according to an exemplary embodiment of the present invention.

FIG. 9 is a graph illustrating a direct measurement of a MAP multiplexed signal according to an exemplary embodiment of the present invention. The measurement illustrated in FIG. 9 is the voltage output of the MAP pressure signal multiplexer (See FIG. 4A). As can be seen in FIG. 9, the minimum absolute pressure values, which relate closely to the BDC piston position of each cylinder, are preserved, which results in greater accuracy of the existing ECU in determining mass of air based on the speed-density algorithm. The importance of the piston BDC position is that it represents the point at which most of the air has entered the cylinder. The piston BDC position is a convenient calculation point since the cylinder volume is at its maximum and its value there is well known.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A pressure measurement system, comprising:
  a multiplexer unit which inputs a plurality of electrical signals representative of pressures; and
  a comparison unit which compares the electrical signals representative of pressures among each other to determine a specified signal characteristic of the electrical signals representative of pressures,
  wherein the multiplexer unit selects one of the electrical signals representative of pressures as an output signal based on the determination of the specified signal characteristic of the electrical signals representative of pressure, and outputs the selected signal.

2. The system of claim 1, wherein the comparison unit comprises comparison circuitry which performs binary-tree comparison of the input electrical signals.

3. The system of claim 1, wherein the multiplexer unit further comprises a switch operable to output the selected one electrical signal.

4. The system of claim 1, wherein the plurality of electrical signals are representative of manifold absolute pressures.

5. The system of claim 4, wherein each of the plurality of electrical signals are representative of pressure in one of a plurality of intake runners of an internal combustion engine.

6. The system of claim 1, wherein the specified signal characteristic is a minimum value among the compared electrical signals.

7. A pressure measurement system, comprising:
  a processor which inputs a plurality of electrical signals representative of pressures and compares the electrical signals representative of pressures among each other to determine a specified signal characteristic of the electrical signals representative of pressures, wherein the processor selects one of the electrical signals representative of pressures as an output signal based on the determination of the specified signal characteristic of the electrical signals representative of pressures; and an output unit which outputs the selected signal.

8. The system of claim 7, further comprising an analog-to-digital converter which receives the plurality of electrical signals, converts them to digital signals, and provides the digital signals to the processor.

9. The system of claim 8, wherein the analog-to-digital converter comprises one input channel and one output channel corresponding to each of the electrical signals.

10. The system of claim 7, wherein the output unit comprises a digital-to-analog converter.

11. The system of claim 10, wherein the processor comprises the digital-to-analog converter.

12. The system of claim 7, wherein the processor comprises an analog-to-digital converter having one input channel for receiving each of the electrical signals.

13. A method of measuring pressure, comprising:

receiving a plurality of electrical signals representative of pressures;

comparing the plurality of received electrical signals representative of pressures among each other to determine a specified signal characteristic of the electrical signals representative of pressures; and selecting one of the electrical signals representative of pressures as an output signal based on the determination of the specified signal characteristic of the electrical signals representative of pressures.

14. The method of claim 13, wherein the comparing the received electrical signals comprises performing a binary-tree comparison of the received electrical signals.

15. The method of claim 13, wherein the plurality of received electrical signals comprises a plurality of manifold absolute pressure signals.

16. The method of claim 15, wherein each of the plurality of manifold absolute pressure signals is representative of pressure in one of a plurality of intake runners of an internal combustion engine.

17. The method of claim 13, wherein the specified signal characteristic is a minimum value among the compared electrical signals.

18. A non-transitory computer readable medium having stored therein a program for causing a processor to execute a method of measuring pressure, the program including computer executable instructions for performing steps comprising:

receiving a plurality of electrical signals representative of pressures;

comparing the plurality of received electrical signals representative of pressures among each other to determine a specified signal characteristic of the electrical signals representative of pressures; and selecting one of the electrical signals representative of pressures as an output signal based on the determination of the specified signal characteristic of the electrical signals representative of pressures.

19. The non-transitory computer readable medium having stored therein a program as defined in claim 18, the program further comprising steps for performing a binary-tree comparison of the received electrical signals.

* * * * *